United States Patent
Lee et al.

(10) Patent No.: US 10,556,582 B2
(45) Date of Patent: Feb. 11, 2020

(54) HYBRID VEHICLE AND MODE SWITCHING METHOD THEREFOR

(71) Applicants: HYUNDAI MOTOR COMPANY, Seoul (KR); KIA MOTORS CORPORATION, Seoul (KR)

(72) Inventors: Jea Mun Lee, Seoul (KR); Jee Wook Huh, Gwangmyeong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 141 days.

(21) Appl. No.: 15/854,897

(22) Filed: Dec. 27, 2017

(65) Prior Publication Data

US 2018/0297577 A1    Oct. 18, 2018

(30) Foreign Application Priority Data

Apr. 17, 2017 (KR) .................. 10-2017-0049193

(51) Int. Cl.
*B60W 20/10* (2016.01)
*B60W 10/06* (2006.01)
(Continued)

(52) U.S. Cl.
CPC ............ *B60W 20/10* (2013.01); *B60K 6/442* (2013.01); *B60W 10/06* (2013.01); *B60W 10/08* (2013.01);
(Continued)

(58) Field of Classification Search
CPC ...... B60W 20/10; B60W 20/20; B60W 50/06; B60W 10/08; B60W 10/06;
(Continued)

(56) References Cited

U.S. PATENT DOCUMENTS 7,826,941 B2 * 11/2010 Hayashi .............. B60K 6/48 701/22
2008/0091314 A1 * 4/2008 Hayashi .............. B60K 6/48 701/22
(Continued)

FOREIGN PATENT DOCUMENTS

JP    2008-068739 A    3/2008
JP    2008-179339 A    8/2008
(Continued)

OTHER PUBLICATIONS

Korean Notice of Allowance issued in Applicatin No. 10-2017-0049193 dated May 17, 2018.

*Primary Examiner* — Muhammad Shafi
(74) *Attorney, Agent, or Firm* — Morgan, Lewis & Bockius LLP

(57) ABSTRACT

A mode switching method of a hybrid vehicle includes: determining a reference on-power as a reference for switching from a first mode to a second mode and a reference off-power as a reference for switching from the second mode to the first mode; determining a minimum on-power, a minimum off-power, and a maximum off-power; and determining a final on-power and a final off-power using the reference on-power, the reference off-power, the minimum on-power, the minimum off-power, and the maximum off-power.

17 Claims, 6 Drawing Sheets

(51) Int. Cl.
*B60W 10/08* (2006.01)
*B60W 30/18* (2012.01)
*B60W 50/06* (2006.01)
*B60K 6/442* (2007.10)
*B60W 20/20* (2016.01)
*B60K 6/485* (2007.10)
*B60K 6/48* (2007.10)

(52) U.S. Cl.
CPC ....... *B60W 20/20* (2013.01); *B60W 30/18072* (2013.01); *B60W 50/06* (2013.01); *B60K 6/485* (2013.01); *B60K 2006/4825* (2013.01); *B60W 2540/10* (2013.01); *B60W 2710/06* (2013.01); *B60W 2710/08* (2013.01); *B60Y 2200/92* (2013.01); *B60Y 2300/182* (2013.01); *Y02T 10/6221* (2013.01); *Y02T 10/6286* (2013.01); *Y02T 10/6295* (2013.01); *Y10S 903/93* (2013.01)

(58) Field of Classification Search
CPC ....... B60W 30/18072; B60W 2540/10; B60W 2710/06; B60W 2710/08; B60K 6/442; B60K 2006/4825; B60K 6/485; Y02T 10/6295; Y02T 10/6286; Y02T 10/6221; B60Y 2200/92; B60Y 2300/182; Y10S 903/93

USPC .......................................................... 701/22
See application file for complete search history.

(56) References Cited

U.S. PATENT DOCUMENTS

| | | | |
|---|---|---|---|
| 2015/0019061 | A1 | 1/2015 | Ueno |
| 2016/0244051 | A1* | 8/2016 | Ikeda ................. B60K 6/48 |
| 2016/0280232 | A1* | 9/2016 | Amano ............... B60K 6/48 |
| 2017/0015301 | A1* | 1/2017 | Yamamoto ......... B60K 6/48 |
| 2017/0057488 | A1* | 3/2017 | Lee ................... B60W 20/40 |
| 2017/0066437 | A1* | 3/2017 | Yamamoto ......... B60K 6/48 |

FOREIGN PATENT DOCUMENTS

| | | |
|---|---|---|
| JP | 2010-047257 A | 3/2010 |
| JP | 2010-221853 A | 10/2010 |
| KR | 10-2013-0074193 A | 7/2013 |
| KR | 10-1361384 B1 | 2/2014 |
| KR | 10-2016-0146020 A | 12/2016 |
| KR | 10-1684543 B1 | 12/2016 |
| KR | 10-2017-0028139 A | 3/2017 |

* cited by examiner

- PRIOR ART -

- PRIOR ART -

HYBRID VEHICLE AND MODE SWITCHING METHOD THEREFOR

CROSS-REFERENCE TO RELATED APPLICATION

This application claims the benefit of priority to Korean Patent Application No. 10-2017-0049193, filed on Apr. 17, 2017, which is hereby incorporated by reference as if fully set forth herein.

TECHNICAL FIELD

The present disclosure relates to a hybrid vehicle and a mode switching method therefor, and more particularly, to a mode switching method and a hybrid vehicle for performing the same, for preventing modes from being frequently switched and preventing a mode from being unnecessarily maintained.

BACKGROUND

In general, a hybrid electric vehicle (HEV) refers to a vehicle that uses two power sources including an engine and an electric motor. An HEV has excellent fuel efficiency and engine performance compared with a vehicle including only an internal combustion engine and is also advantageous for lowering emissions, and thus, has been actively developed recently.

Such a hybrid vehicle travels in two modes according to a powertrain used to drive the vehicle. One of the modes is an electric vehicle (EV) mode in which the vehicle travels using only an electric motor and the other one of the modes is a hybrid electric vehicle (HEV) mode for operating both an electric motor and an engine to acquire power. A hybrid vehicle switches between the two modes according to driving conditions.

It is advantageous that such an EV mode does not consume fuel during driving but the EV mode cannot satisfy driver requested power that exceeds maximum motor output. In an HEV mode, a vehicle uses an engine as a main power source and, in this case, travels while a motor is being recharged or discharged as necessary. Accordingly, the HEV mode can satisfy high driver requested power and consumes fuel, unlike the EV mode.

As a result, fuel efficiency and drivability of a corresponding vehicle are determined depending on switching control between the aforementioned two modes. In general, switching between the two modes is determined depending on driver requested power/torque, vehicle speed, a battery state of charge (SOC), and the like and a switching condition to the HEV mode from the EV mode and a switching condition to the EV mode from the HEV mode are differently set. This is because, if the switching conditions between the two modes are set to be the same, the two modes are excessively frequently switched depending on change in driver requested power/torque, which will be described with reference to FIG. 1.

FIG. 1 is a diagram showing an example of a mode switching condition of a general hybrid vehicle.

In FIG. 1, switching between EV and HEV modes is assumed to be determined based on a driver requested power. In addition, in a graph of FIG. 1, a vertical axis indicates the driver requested power and a horizontal axis indicates time.

Referring to FIG. 1, when the driver requested power equal to or greater than an HEV mode entrance reference line (On Line) in the EV mode, the EV mode may be switched to the HEV mode. In addition, when the driver requested power is equal to or less than an EV mode entrance reference line (Off Line) in the HEV mode, the HEV mode may be switched to the EV mode. As a result, when the driver requested power exceeds On Line, a current mode is switched to the HEV mode but, even if the driver requested power is lowered below On Line, the HEV mode is maintained as long as the driver requested power above Off Line, thereby preventing modes from being frequently switched.

As such, the On Line and the Off Line are differently set, and in general, the Off Line is determined by subtracting predetermined hysteresis power (Hys.Power), i.e., Delta Power from On Line. Here, the On Line and the Hys.Power may be determined depending on vehicle speed and battery SOC.

Hereinafter, a problem that arises when a general mode switching condition is fixed will be described with reference to FIGS. 2 and 3.

FIGS. 2 and 3 are diagrams for explanation of a problem of a general mode switching condition.

First, when a mode switching condition is set to be fixed, it is not possible to control a time point of re-switching to an EV mode according to change in a travelling situation. For example, when EV driving is maintained due to a high battery SOC, fuel consumption may be prevented. To this end, to impede entrance into an HEV mode, On Line needs to be raised and, to guide switching to an EV mode from an HEV mode, hysteresis power needs to be lowered. As a result, for effective mode switching when a SOC is high, the mode switching condition needs to be the same as in FIG. 2. However, when the SOC is not high, appropriate hysteresis power cannot be ensured.

As shown in FIG. 3, even if hysteresis power is fixed, when On Line is set to be low, Off Line becomes lower than a coasting power line in a non-driving force state (e.g., coasting) in which a driver takes their foot off an accelerator pedal (APS off). That is, since the coasting power line that indicates requested power during coasting becomes driver requested power, Off Line is always lower than requested power and, accordingly, there is a problem in that an HEV mode is not capable of being released even in an accelerator pedal off (APS off) state.

Accordingly, there is a need for a mode switching control method for preventing modes from being frequently switched and preventing an inappropriate mode from being forcibly maintained.

SUMMARY

An object of the present disclosure is to provide an effective mode switching method of a hybrid vehicle and a vehicle for performing the method.

In particular, the present disclosure provides a mode switching method and a vehicle for performing the same, for preventing modes from being frequently switched and preventing a mode from being unnecessarily maintained.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mode switching method of a hybrid vehicle includes: determining, by a hybrid controller, a reference on-power as a reference for switching from a first mode to a second mode and a reference off-power as a reference for switching from the second mode to the first mode; determining, by the hybrid controller, a minimum on-power, a minimum off-power, and a maximum off-power; and determining, by the hybrid controller, a final on-power and a final off-power using the reference on-power, the reference off-power, the minimum on-power, the minimum off-power, and the maximum off-power.

In another aspect of the present disclosure, a hybrid vehicle includes a motor controller configured to control an electric motor; an engine controller configured to control an engine; and a hybrid controller configured: to determine whether the vehicle switches between a first mode in which the vehicle travels using a power of the electric motor and a second mode in which the vehicle travels using both the power of the electric motor and a power of the engine and to control the motor controller and the engine controller based on the determination. The hybrid controller determines a reference on-power as a reference for switching from the first mode to the second mode, a reference off-power as a reference for switching from the second mode to the first mode, determines a minimum on-power, a minimum off-power, and a maximum off-power, and determines a final on-power and a final off-power using the reference on-power, the reference off-power, the minimum on-power, the minimum off-power, and the maximum off-power.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to a hybrid vehicle and an effective shift control method therefor according to embodiments of the present disclosure, examples of which are illustrated in the accompanying drawings. The suffixes "module" and "unit" of elements herein are used for convenience of description and thus can be used interchangeably and do not have any distinguishable meanings or functions.

First, a structure of a hybrid vehicle to which embodiments of the present disclosure are applicable will be described with reference to FIG. 4.

Figure 1:
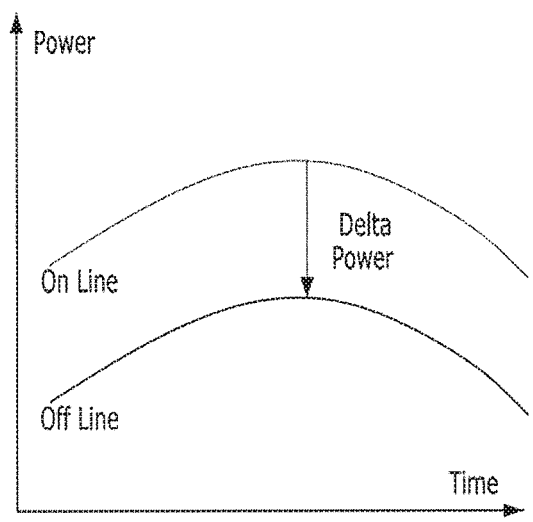
FIG. 1 is a diagram showing an example of a mode switching condition of a general hybrid vehicle.
Figure 2:
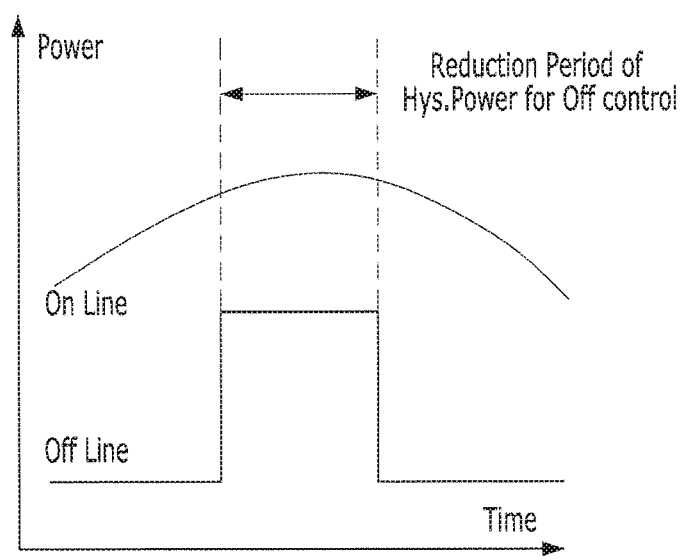
FIGS. 2 and 3 are diagrams for explanation of a problem of general mode switching condition.
Figure 3:
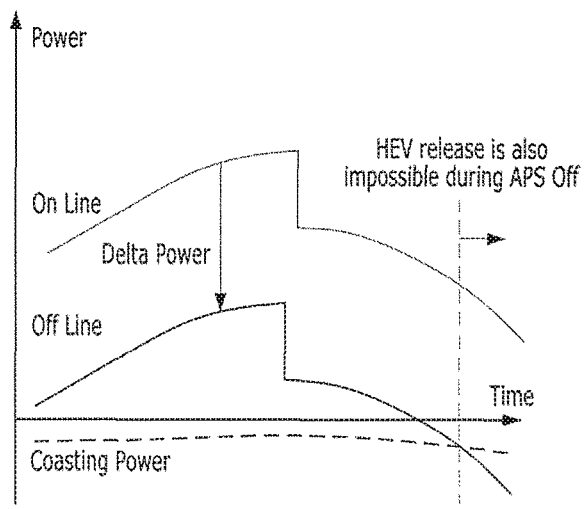
Figure 4:
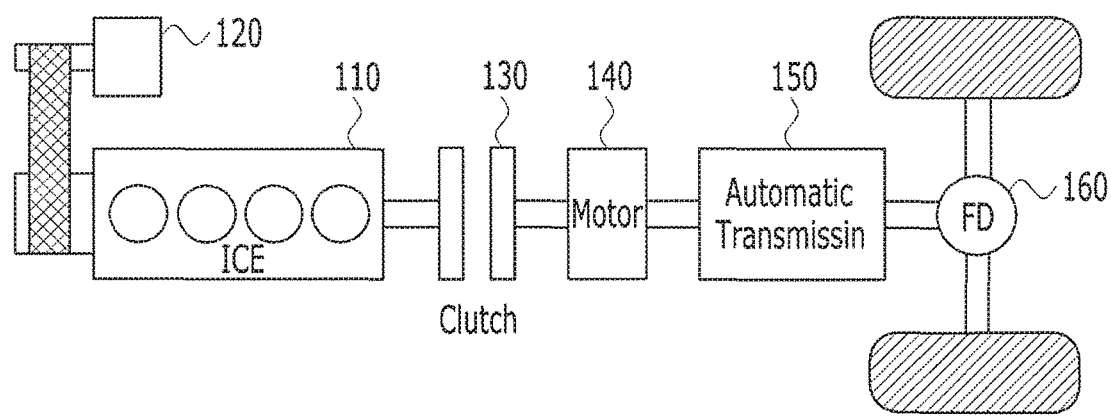
FIG. 4 is a diagram illustrating an example of a powertrain structure of a hybrid vehicle to which embodiments of the present disclosure are applicable.

FIG. 4 is a diagram illustrating an example of a powertrain structure of a hybrid vehicle to which embodiments of the present disclosure are applicable.

FIG. 4 illustrates a powertrain of a hybrid vehicle including a parallel type hybrid system including an electric motor 140 (or a driving motor) and an engine clutch 130 that are installed between an internal combustion engine (ICE) 110 and a transmission 150.

In such a vehicle, in general, when a driver presses an accelerator after turning on the vehicle, the motor 140 is driven using power of a battery while the engine clutch 130 is opened and transmits power to move wheels through the transmission 150 and a final drive (FD) 160 (i.e., EV mode). As the vehicle gradually accelerates, high driving force is further required and, in this case, an auxiliary motor (or a starter generator motor 120) may be operated to drive the engine 110.

Accordingly, when rotational speeds of the engine 110 and the motor 140 are equal to each other, the engine clutch 130 is then engaged such that both the engine 110 and the motor 140 drive the vehicle (i.e., transition to an HEV mode from an EV mode). When a predetermined engine off condition such as vehicle deceleration is satisfied, the engine clutch 130 is opened and the engine 110 stops (i.e., transition to an EV mode from an HEV mode). In this case, the vehicle recharges a battery through a motor using driving force of a wheel, which is referred to as braking energy regeneration or regenerative braking. Accordingly, the starter generator motor 120 functions as a starter motor when the engine is turned on and functions as a generator after the engine is turned on or when rotational energy is recovered during engine off, and thus, the starter generator motor 120 may also be referred to as a hybrid starter generator (HSG).

Figure 5:
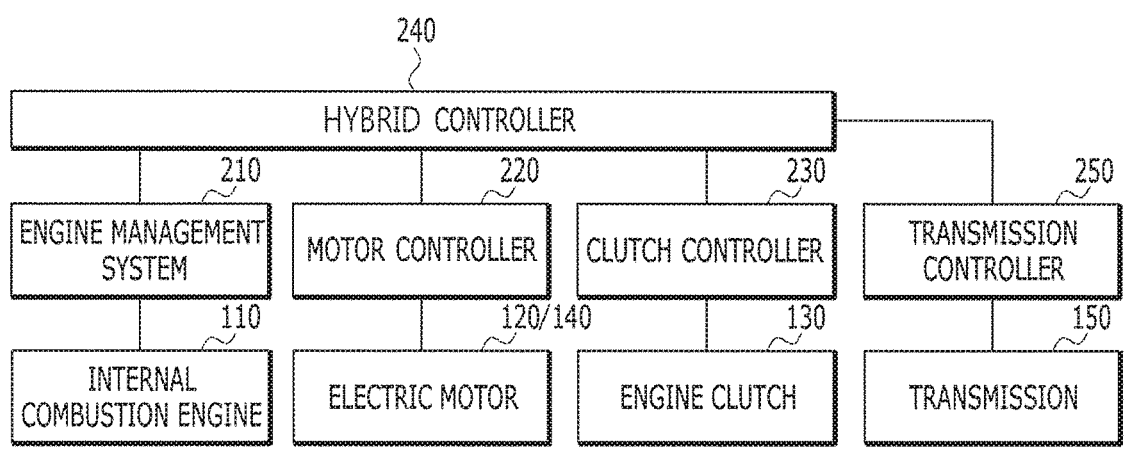
FIG. 5 is a block diagram showing an example of a control system of a hybrid vehicle to which embodiments of the present disclosure are applicable.

A relationship among controllers of a vehicle including the aforementioned powertrain is shown in FIG. 5.

FIG. 5 is a block diagram showing an example of a control system of a hybrid vehicle to which embodiments of the present disclosure are applicable.

Referring to FIG. 5, in the hybrid vehicle to which embodiments of the present disclosure are applicable, an internal combustion engine 110 may be controlled by an engine controller 210, torque of the starter generator motor 120 and the motor 140 may be controlled by a motor control unit (MCU) 220, and the engine clutch 130 may be controlled by a clutch controller 230. Here, the engine controller 210 may also be referred to as an engine management system (EMS) as shown in FIG. 5. In addition, the transmission 150 may be controlled by a transmission controller 250. In some embodiments, the starter generator motor 120 and the motor 140 may be controlled by different separate motor controllers.

Each controller may be connected to a controller (hereinafter, a hybrid controller or a hybrid control unit (HCU)) for controlling an overall operation of a powertrain as a high-level controller in a hybrid vehicle and may provide information required to switch driving modes and to control an engine clutch during gear transmission, and/or information required to control engine off or may perform an operation according to a control signal under control of a hybrid controller 240.

In more detail, the hybrid controller 240 may determine whether a mode is switched depending on a driving state of a vehicle. For example, the hybrid controller may determine an open time of the engine clutch (EC) 130 and may control hydraulic pressure (in the case of a wet EC) or control torque capacity (in the case of a dry EC) when the EC is opened. The hybrid controller 240 may determine an EC state (lock-up, slip, open, etc.) and may control a time for stop of fuel injection of the engine 110. In addition, the hybrid controller may control torque of the starter generator motor 120 to control engine off and may control engine rotational energy recovery.

Needless to say, it would be obvious to one of ordinary skill in the art that the aforementioned relationship between the controllers and functions/divisions of the controllers are exemplary and, thus, are not limited to the terms. For example, the hybrid controller 240 may be embodied by allowing any one of other controllers except for the hybrid controller 240 to provide a corresponding function or two or more of other controllers may distribute and provide the corresponding function.

Hereinafter, a mode switching control method according to the present embodiment based on the aforementioned vehicle structure will be described.

First, determination of off-power according to the present embodiment will be described with reference to FIGS. 6A and 6B.

Figure 6A:
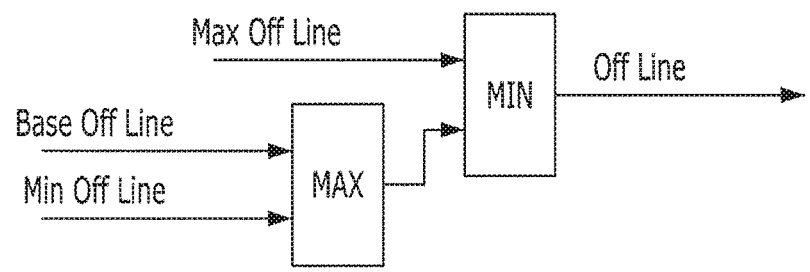
FIGS. 6A and 6B are diagrams showing an example of a method of determining off-power of a hybrid vehicle according to an embodiment of the present disclosure.
Figure 6B:
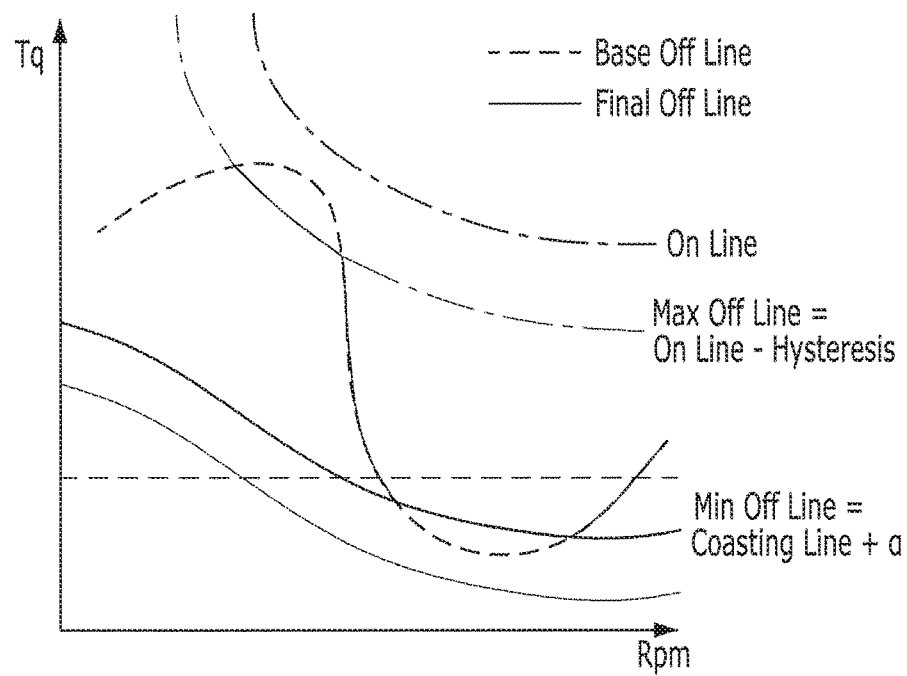

FIGS. 6A and 6B are diagrams showing an example of a method of determining off-power of a hybrid vehicle according to an embodiment of the present disclosure.

Referring to FIG. 6A, Max Off Line, Base Off Line, and Min Off Line may be used to determine off-power.

Here, the Max Off Line is a line formed by connecting plots of maximum off-powers, the Base Off Line is a line formed by connecting independently set plots of base off-powers depending on torque and RPM, and the Min Off Line is a line formed by connecting plots of minimum off-powers depending on torque and RPM.

The function and meaning of each of the aforementioned powers will now be described.

First, base off-power refers to EV mode switching reference power of optimum efficiency that is predetermined according to vehicle type.

The maximum off-power may be a value obtained by subtracting a predetermined margin (hysteresis) for preventing modes from being frequently switched from original on-power and may prevent modes from being frequently switched.

The minimum off-power may prevent a malfunction of maintaining an HEV mode without a demand for driving, such as APS off, and may be a value obtained by adding an APS off determination margin ($\alpha$) to coasting power.

Accordingly, as shown in FIG. 6B, Final Off Line may be determined based on Base Off Line by selecting values that are greater than Min Off Line to prevent an HEV mode from being maintained and are smaller than Max Off Line to prevent modes from being frequently switched.

Hereinafter, determination of on-power according to the present embodiment will be described with reference to FIGS. 7A and 7B.

Figure 7A:
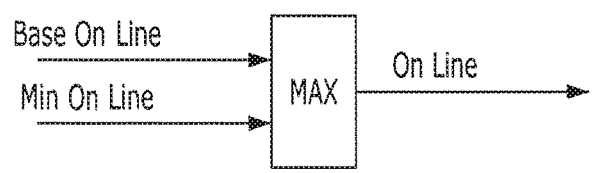
FIGS. 7A and 7B are diagrams showing an example of a method of determining on-power in a hybrid vehicle according to an embodiment of the present disclosure.
Figure 7B:
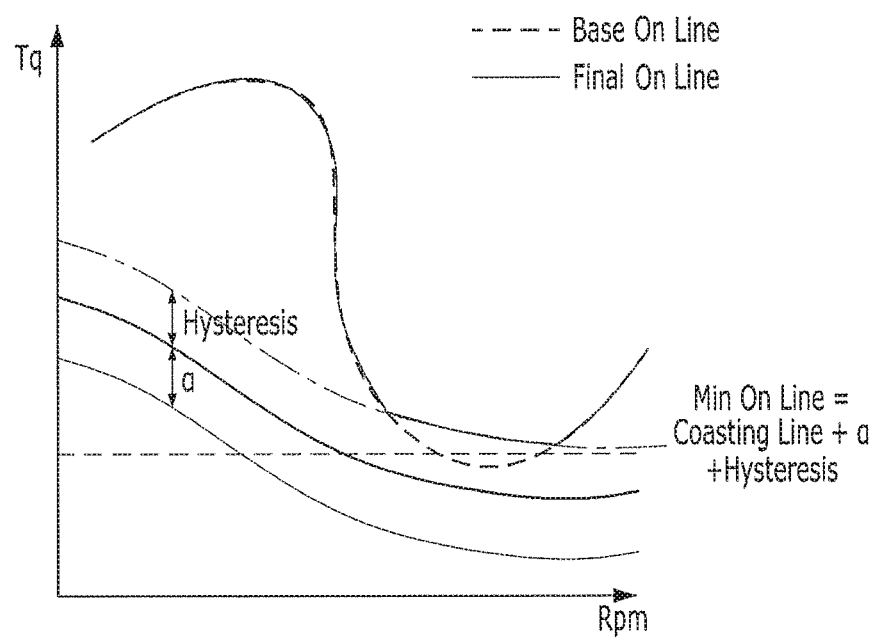

FIGS. 7A and 7B are diagrams showing an example of a method of determining on-power in a hybrid vehicle according to an embodiment of the present disclosure.

Referring to FIG. 7A, Min On Line and Base On Line may be used to determine on-power.

Here, the Min On Line refers to a line formed by connecting plots of minimum on-powers depending on torque, and the RPM and Base On Line refers to a line formed by connecting independently set plots of base off-powers depending on torque and RPM.

The function and meaning of each of the aforementioned powers will now be described.

First, base on-power refers to HEV mode switching reference power of optimum efficiency that is predetermined according to vehicle type.

The minimum on-power may prevent reversal between off-power and on-power and may be a value obtained by adding, to coasting power, an APS off determination margin ($\alpha$) and a minimum margin (hysteresis) for preventing modes from being frequently switched.

Accordingly, as shown in FIG. 7B, Final On Line may be determined based on Base On Line by selecting values that are greater than Min On Line to prevent reversal between off-power and on-power.

Figure 8:
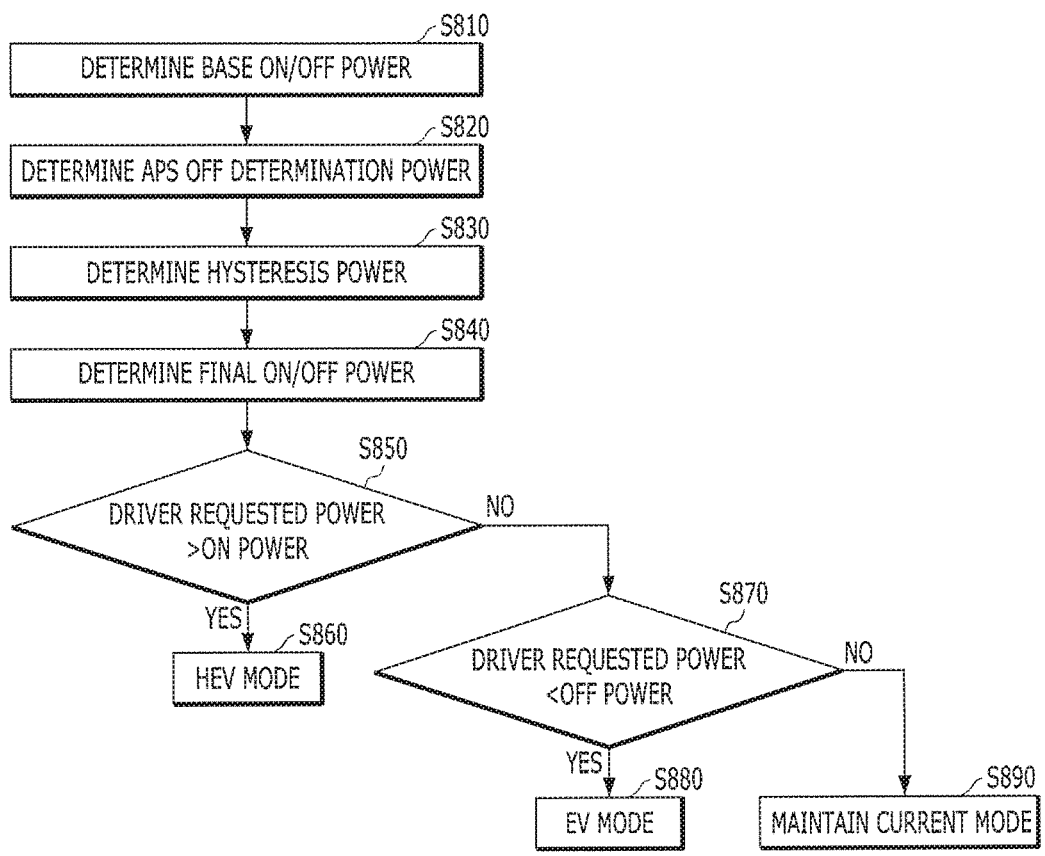
FIG. 8 shows an example of a mode switching procedure in a hybrid vehicle according to an embodiment of the present disclosure.

FIG. 8 is a flowchart of a mode switching procedure using Final On line and Off Line that have been described above with reference to FIGS. 6A-7B.

FIG. 8 shows an example of a mode switching procedure in a hybrid vehicle according to an embodiment of the present disclosure.

Each determination operation of FIG. 8 may be performed by the hybrid controller 240 shown in FIG. 5. Referring to FIG. 8, first, base on-power and base off-power may be determined (S810). In this case, the base on-power and the base off-power may be pre-stored values.

In addition, APS off determination margin ($\alpha$) power and minimum margin (hysteresis) power for preventing modes from being frequently switched may be determined (S820 and S830).

When each power is determined, the hybrid controller may determine final on/off power using the determined power via calculation shown in FIGS. 6A and 7A (S840).

When the final on/off power is determined, if driver requested power is greater than the final on-power based on the determination (S850), the hybrid controller may determine to switch to an HEV mode (S860).

When the driver requested power is less than the final off power (S870), the hybrid controller may switch to an EV mode (S880), otherwise, may maintain the current mode (S890).

Through the aforementioned procedure, frequent mode switching or reversal between on/off lines may be prevented to optimize a time point of releasing an HEV mode and to ensure robustness of mode switching reference.

The hybrid vehicle configured as described above according to at least one embodiment or the present disclosure may effectively switch modes.

In particular, an off line and an on line are independently set to prevent an HEV mode from being forcibly maintained.

When engine knocking occurs, reduction in torque due to knocking is compensated for by an electric motor to prevent output from being reduced and to enhance fuel efficiency.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, carrier waves (e.g., transmission via the Internet), etc.

It will be apparent to those skilled in the art that various modifications and variations can be made in the present disclosure without departing from the spirit or scope of the inventions. Thus, it is intended that the present disclosure cover the modifications and variations of this invention provided they come within the scope of the appended claims and their equivalents.

What is claimed is:

1. A mode switching method of a hybrid vehicle, the method comprising steps of:
    determining, by a hybrid controller, a reference on-power as a reference for switching from a first mode to a second mode and a reference off-power as a reference for switching from the second mode to the first mode;
    determining, by the hybrid controller, a minimum on-power, a minimum off-power, and a maximum off-power; and
    determining, by the hybrid controller, a final on-power and a final off-power using the reference on-power, the reference off-power, the minimum on-power, the minimum off-power, and the maximum off-power,
    wherein the minimum on-power is a value obtained by adding a first margin power of an accelerator pedal and a second margin power to a first power during coasting.

2. The method according to claim 1, further comprising:
    switching, by the hybrid controller, to the second mode when a driver requested power is greater than the final on-power; and
    switching, by the hybrid controller, to the first mode when the driver requested power is less than the final off-power.

3. The method according to claim 2, further comprising:
    maintaining, by the hybrid controller, a current mode of the first mode and the second mode when the driver requested power is equal to or less than the final on-power and is equal to or greater than the final off-power.

4. The method according to claim 1, wherein the final on-power is determined as a greater value among the reference on-power and the minimum on-power.

5. The method according to claim 1, wherein the final off-power is determined as a smaller value obtained by comparing a greater value between the reference off-power and the minimum off-power with the maximum off-power.

6. The method according to claim 1, wherein the minimum off-power is a value obtained by adding the first margin power to the first power.

7. The method according to claim 6, wherein the maximum off-power is a value obtained by subtracting a third margin power from a second power.

8. The method according to claim 1, wherein the first mode is an electric vehicle (EV) mode, and the second mode is a hybrid electric vehicle (HEV) mode.

9. A non-transitory computer-readable recording medium containing program instructions executable by a processor, the computer-readable medium containing:
    program instructions that determine a reference on-power as a reference for switching from a first mode to a second mode and a reference off-power as a reference for switching from the second mode to the first mode;
    program instructions that determine a minimum on-power, a minimum off-power, and a maximum off-power; and
    program instructions that determine a final on-power and a final off-power using the reference on-power, the reference off-power, the minimum on-power, the minimum off-power, and the maximum off-power,
    wherein the minimum on-power is a value obtained by adding a first margin power of an accelerator pedal and a second margin power to a first power during coasting.

10. A hybrid vehicle comprising:
    a motor controller configured to control an electric motor;
    an engine controller configured to control an engine; and
    a hybrid controller configured: to determine whether the hybrid vehicle switches between a first mode in which the hybrid vehicle travels using power of the electric motor and a second mode in which the hybrid vehicle travels using both the power of the electric motor and power of the engine; and to control the motor controller and the engine controller based on the determination,
    wherein the hybrid controller: determines a reference on-power as a reference for switching from the first mode to the second mode and a reference off-power as a reference for switching from the second mode to the first mode; determines a minimum on-power, a minimum off-power, and a maximum off-power; and determines a final on-power and a final off-power using each of the reference on-power, the reference off-power, the minimum on-power, the minimum off-power, and the maximum off-power, and
    wherein the minimum on-power is a value obtained by adding a first margin power of an accelerator pedal and a second margin power to a first power during coasting.

11. The hybrid vehicle according to claim 10, wherein the hybrid controller switches to the second mode when a driver requested power is greater than the final on-power and switches to the first mode when the driver requested power is less than the final off-power.

12. The hybrid vehicle according to claim 11, wherein the hybrid controller maintains a current mode of the first mode and the second mode when the driver requested power is equal to or less than the final on-power and is equal to or greater than the final off-power.

13. The hybrid vehicle according to claim 10, wherein the final on-power is determined as a greater value among the reference on-power and the minimum on-power.

14. The hybrid vehicle according to claim 10, wherein the final off-power is determined as a smaller value obtained by comparing a greater value among the reference off-power and the minimum off-power with the maximum off-power.

15. The hybrid vehicle according to claim 10, wherein the minimum off-power is a value obtained by adding the first margin power to the first power.

16. The hybrid vehicle according to claim 15, wherein the maximum off-power is a value obtained by subtracting a third margin power from a second power.

17. The hybrid vehicle according to claim 10, wherein the first mode is an electric vehicle (EV) mode, and the second mode is a hybrid electric vehicle (HEV) mode.

* * * * *